(12) United States Patent  
Okazaki

(10) Patent No.: US 8,073,010 B2
(45) Date of Patent: Dec. 6, 2011

(54) RING TRANSMISSION APPARATUS AND SIGNAL PROCESSING METHOD

(75) Inventor: Kohei Okazaki, Tokyo (JP)

(73) Assignee: NEC Corporation, Tokyo (JP)

(*) Notice: Subject to any disclaimer, the term of this patent is extended or adjusted under 35 U.S.C. 154(b) by 1019 days.

(21) Appl. No.: 11/877,709

(22) Filed: Oct. 24, 2007

(65) Prior Publication Data

US 2008/0260382 A1  Oct. 23, 2008

(30) Foreign Application Priority Data

Oct. 24, 2006 (JP) ................................ 2006-288935

(51) Int. Cl.
*H04J 3/24* (2006.01)

(52) U.S. Cl. ......... 370/473; 370/404; 370/405; 370/389

(58) Field of Classification Search .................. 370/473, 370/487, 380, 470, 419, 460, 389, 404, 405, 370/452
See application file for complete search history.

(56) References Cited

U.S. PATENT DOCUMENTS

| 5,786,913 | A | * | 7/1998 | Pfeiffer | 398/59 |
| 5,995,257 | A | * | 11/1999 | Johnson et al. | 398/83 |
| 6,331,906 | B1 | * | 12/2001 | Sharma et al. | 398/48 |
| 6,348,985 | B1 | * | 2/2002 | Jiang et al. | 398/82 |
| 6,959,008 | B2 | * | 10/2005 | McClary et al. | 370/474 |
| 7,042,835 | B1 | * | 5/2006 | de Boer et al. | 370/222 |
| 7,272,321 | B1 | * | 9/2007 | Kuo et al. | 398/99 |
| 7,333,512 | B2 | * | 2/2008 | Kumar et al. | 370/473 |
| 2002/0075868 | A1 | * | 6/2002 | Gupta et al. | 370/389 |
| 2003/0198472 | A1 | * | 10/2003 | Talbot | 398/59 |
| 2004/0208554 | A1 | * | 10/2004 | Wakai et al. | 398/54 |

FOREIGN PATENT DOCUMENTS

| JP | 2001-168894 | 6/2001 |
| WO | 03-015351 | 2/2003 |

OTHER PUBLICATIONS

Japanes Official Action—2006-288935—Sep. 13, 2011.

* cited by examiner

*Primary Examiner* — Ricky Ngo
*Assistant Examiner* — Dewanda Samuel
(74) *Attorney, Agent, or Firm* — Young & Thompson

(57) ABSTRACT

On an optical ring network side, an optical ring transmission apparatus is provided with a first ring-side TDM device and a separately implemented first packet ring device, on a first ring side. On a client network side, the apparatus is provided with a first client-side TDM device and a first packet transceiver, which are implemented separately from the devices on the optical ring network side. The devices on the client network side can be connected to the devices on the optical ring network side through a switch section including a packet switch and a TDM switch. Further, the apparatus has a dual configuration with the provision of devices that pair up with the above-mentioned devices, such as a second packet ring device. The flexibility can be ensured by the redundant configuration and the independent implementation of the devices as described above.

5 Claims, 8 Drawing Sheets

RING TRANSMISSION APPARATUS AND SIGNAL PROCESSING METHOD

BACKGROUND OF THE INVENTION

1. Field of the Invention

This application is based upon and claims the benefit of priority from Japanese Patent Application No. 2006-288935, filed on Oct. 24, 2006, the disclosure of which is incorporated herein in its entirety by reference.

The present invention relates to a ring transmission apparatus and a signal processing method used in a packet ring network such as an optical ring network or the like, which transmits various types of data by using packets. Particularly, the present invention relates to a ring transmission apparatus and a signal processing method that deal with both real-time data such as voice and other types of data.

2. Description of the Related Art

In recent years, there is an increasing demand to construct packet networks that transmit packets to a network, such as an Ethernet™ network, with high liability. On this demand, attention has been given to packet ring networks, which can maintain communications even when a failure occurs, without loss of packets. With such a technical background, an optical ring transmission apparatus is proposed that is mounted with a single packet ring device for connecting to a ring network (see, for example, International Publication No. WO2003/015351). If such an optical ring transmission apparatus adopts a redundant configuration using two packet ring devices, a packet network with higher reliability than conventional ones can be realized. A schematic example of such an apparatus adopting a redundant configuration can be considered as shown in FIG. 1.

FIG. 1 shows a schematic configuration of an optical ring transmission apparatus connected to a ring network. This optical ring transmission apparatus 101 includes a packet ring device 102 incorporating a time-division-multiplex (TDM) switch section 103 and a packet switch section 104, and a packet ring device 105 incorporating a TDM switch section 106 and a packet switch section 107. The TDM switch section 103 is configured to transmit and receive data to/from a first ring 108 of a ring network 110, and the TDM switch section 106 is configured to transmit and receive data to/from a second ring 109 of the ring network 110.

The TDM switch sections 103 and 106 are also connected to a TDM switch 111 and are further connected to the packet switch sections 104 and 107, respectively. The packet switch section (104, 107) is connected to a packet switch 112 to perform multiplexing of packets into a virtual container and demultiplexing of a virtual container into packets. The TDM switch section (103, 106) multiplexes virtual containers received from the packet switch section (104, 107) and the TDM switch 111 into a multiplex signal and demultiplexes a multiplex signal received from the optical ring network 110 into virtual containers forwarded to the packet switch section (104, 107) and virtual containers forwarded to the TDM switch 111. A client network (not shown) is connected to the optical ring network 110 through the optical ring transmission apparatus 101.

In the optical ring transmission apparatus 101 as described above, the TDM switch section 103 and the packet switch section 104 are implemented in parallel in the packet ring device 102 in order to accommodate TDM traffic and packet traffic efficiently. Similarly, the TDM switch section 106 and the packet switch section 107 are implemented in parallel in the packet ring device 105. Packet traffic input from the client network is forwarded to a selected one of the packet switch sections 104 and 107 by the packet switch 112, where packets are processed directly to produce a virtual container. On the other hand, TDM traffic of virtual containers received from the client network is forwarded as it is to a selected one of the TDM switch sections 103 and 106 by the TDM switch 111.

The TDM switch section 103 multiplexes TDM traffic received from the TDM switch 111 and packet-traffic virtual containers received from the packet switch section 104 to produce a multiplex signal, which is further multiplexed by a TDM interface (not shown) into a TDM frame corresponding to the transport band of the ring network 110, and then sent out to the first ring 108. As for the packet ring device 105, the same signal processing is performed.

As described above, the optical ring transmission apparatus 101 can efficiently multiplex TDM traffic and packet traffic and output them onto the ring network 106. Therefore, not only a packet routing function and a TDM framing function are realized, but the TDM switch section (103, 106) and a TDM interface circuit are also implemented.

According to the optical ring transmission apparatus having the redundant configuration as shown in FIG. 1, even if a failure occurs in one of the packet ring devices 103 and 106, communication can be maintained by using the other ring device suffering no failure. Accordingly, it is possible to construct a network that is more reliable than the apparatus disclosed in the above-mentioned document (International Publication No. WO2003/015351). In addition, by adopting such a configuration, it is possible that the traffic input from the client network can be handled by any one of the packet ring devices. Therefore, this optical ring transmission apparatus can be applied not only to connection to a single-ring network but also connection to a multi-ring network or stackable ring network.

However, the TDM switch section and the TDM interface are conventionally implemented in a fixed manner inside the first packet ring device 102 and the second packet ring device 105. Accordingly, the transport band and transmission distance of the packet ring device are determined depending on the TDM switch section and the TDM interface, resulting in a problem that the optical ring transmission apparatus 101 lacks extensibility and flexibility.

Moreover, according to the conventional ring transmission apparatus shown in the above-mentioned document (International Publication No. WO2003/015351), the TDM switch, which processes voice traffic, and the rouging module, which processes data packet traffic, are implemented on a switch card that is a single package. Therefore, according to such a conventional system, the routing module, which processes packets, is implemented on the same switch card that has another switching function. Accordingly, this configuration also lacks the extensibility of the routing module and cannot adapt to a future update.

Here, the transport band means the transmission capacity that an optical ring transmission apparatus can transmit to the optical ring network or the transmission capacity that the optical ring transmission apparatus can receive from the optical ring network. An interface used in transmission of an optical signal generally has a fixed transmission capacity, and transmission/reception cannot be performed with a transmission capacity different from the fixed one. For example, 2.4 Gbps (gigabits per second) or 10 Gbps is used for the interface. In the case of an optical-signal interface, the properties of a received signal are degraded in proportion to the propagation distance depending on the wavelength range and dispersion characteristic of a light source employed. Such signal degradation also causes other restrictions.

To overcome such problems, it is necessary to provide a set of packet ring devices for each one of various transport bands and distances. This makes it difficult to reduce the cost of the optical ring transmission apparatus 101. Moreover, for the TDM switch sections 103 and 106, it is necessary to use those capable of multiplexing traffic, which increases the costs of the first and second packet ring devices 102 and 105.

SUMMARY OF THE INVENTION

Accordingly, an object of the present invention is to provide a ring transmission apparatus that has a redundant configuration and a signal processing method, which can achieve great flexibility.

According to the present invention, a ring transmission apparatus which connects a ring network and a client network, includes:

a switch;

first and second ring-side interface devices which are connected to respective ones of first and second rings of the ring network and to the switch, wherein each of the first and second ring-side interface devices transmits and receives TDM frames to and from the ring network and transmits and receives TDM signals corresponding to the TDM frames to and from the switch;

a client-side TDM interface section which is connected to the client network, wherein the client-side TDM interface section processes TDM traffic transmitted and received to and from the client network and transmits and receives TDM signals corresponding to the TDM traffic to and from the switch;

a client-side packet interface section which is connected to the client network, wherein the client-side packet interface section processes packet traffic transmitted and received to and from the client network and transmits and receives packets corresponding to the packet traffic to and from the switch; and a packet converting section connected to the switch, for converting packets received from the client-side packet interface section to TDM signals and converting TDM signals received from one of the first and second ring-side interface devices to packets, wherein the packet converting section is separated from the first and second ring-side interface devices and the switch.

According to the present invention, the packet ring devices are implemented independently of the I/O interfaces with the ring network, whereby a general high-speed interface can be used on the I/O side connecting to the ring network. Accordingly, as the implementation proportion of the packet switch functionality rises, the greater merit in implementation cost can be recognized, in comparison with conventional schemes. Moreover, when a packet function is added to a TDM-based apparatus, since the packet ring devices are implemented independently of the I/O interfaces with the ring network, it is not necessary to change the setting of the interface portion on the I/O side connecting to the ring network, and it is sufficient only to make a change in the setting of the TDM switch. Accordingly, in operational terms, it can be facilitated to upgrade an apparatus from the TDM-based one to the packet-based one.

DETAILED DESCRIPTION OF THE PREFERRED EMBODIMENT

Hereinafter, the present invention will be described in detail based on an exemplary embodiment.

1. Outline of Optical Ring Transmission Apparatus

Figure 1:
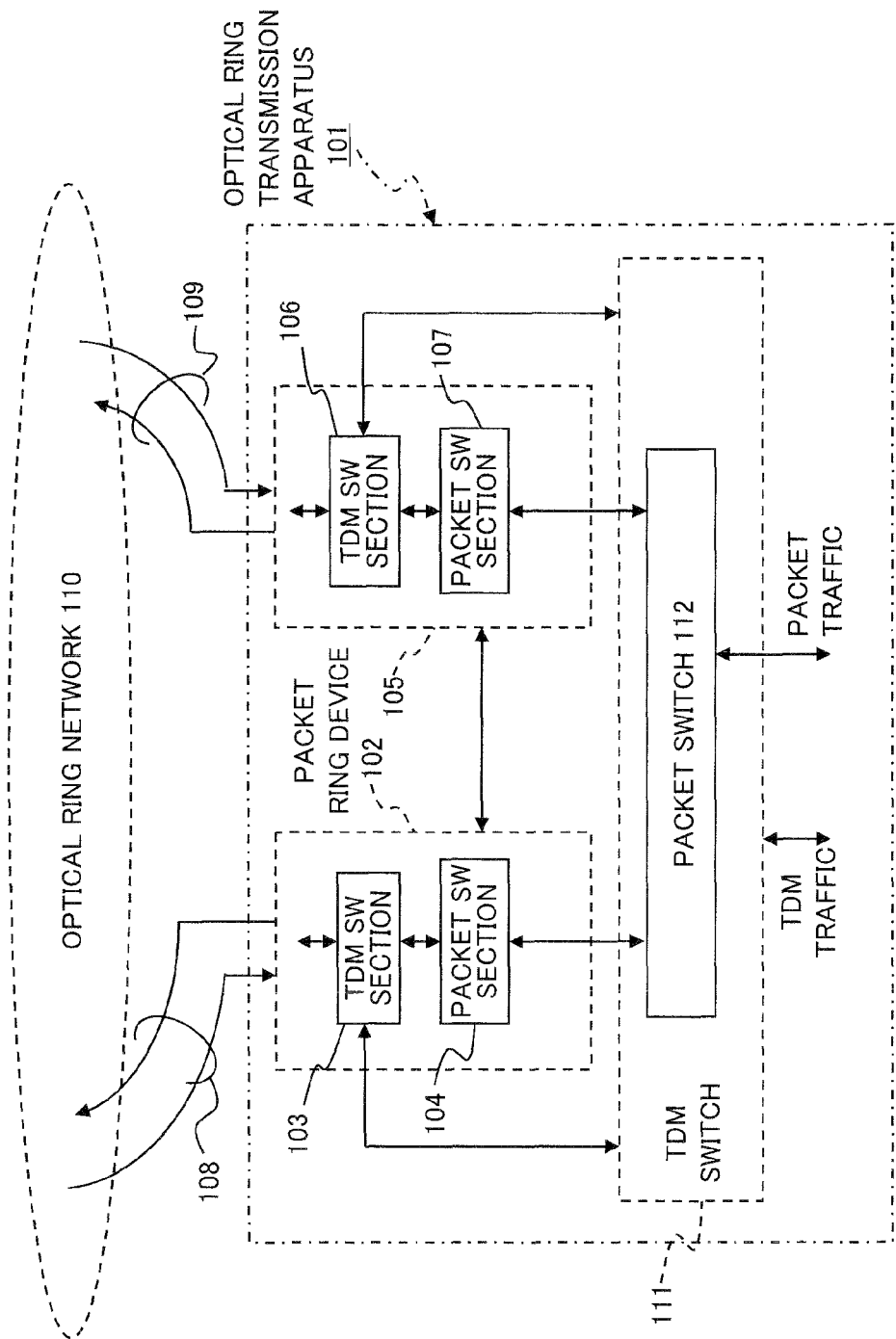
FIG. 1 is a block diagram showing a schematic configuration of a related-art ring transmission apparatus.
Figure 2:
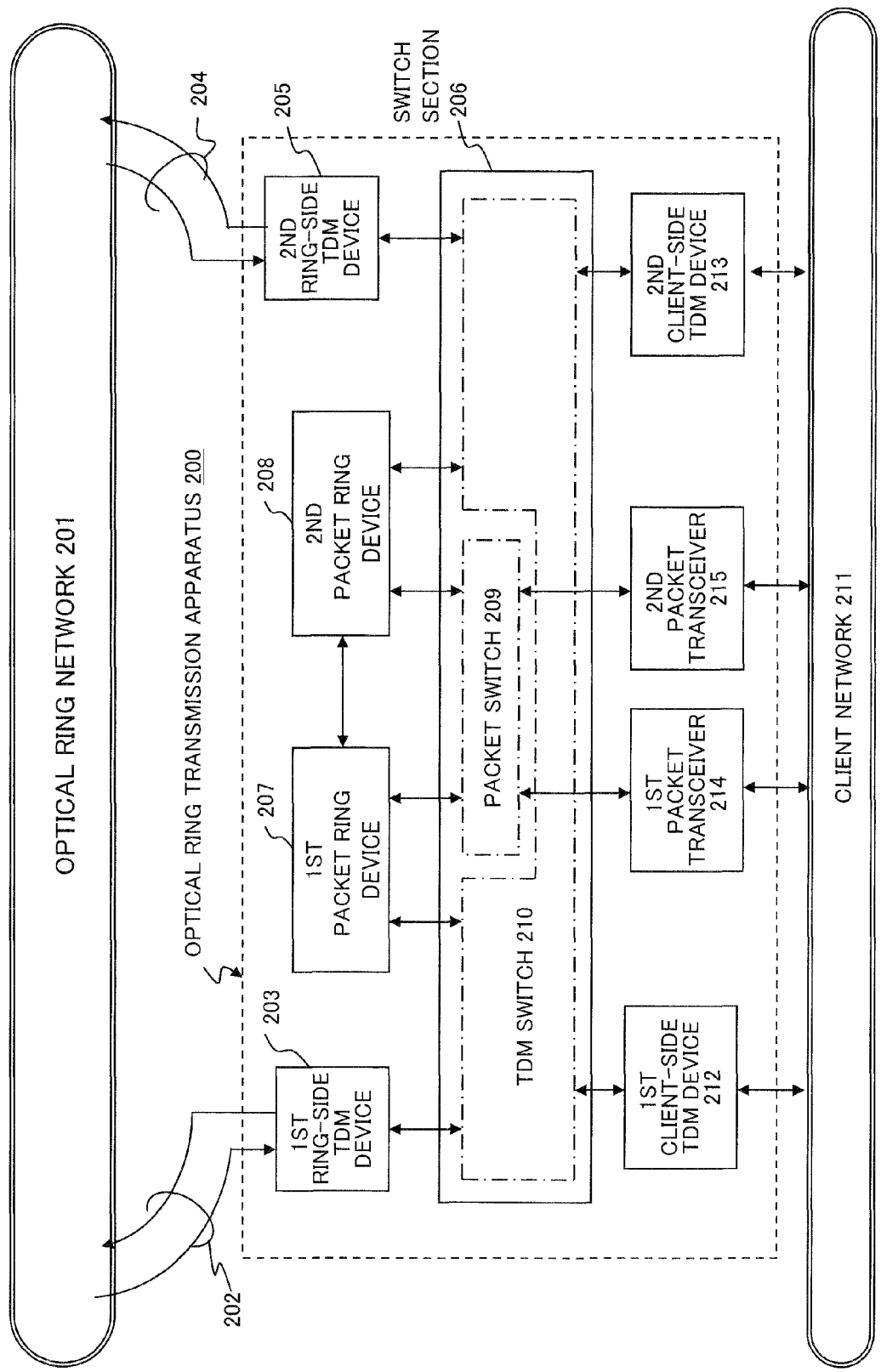
FIG. 2 is a block diagram showing a schematic configuration of an optical ring transmission apparatus connected to an optical ring network, according to an exemplary embodiment of the present invention.

As shown in FIG. 2, an optical ring transmission apparatus 200 according to an exemplary embodiment of the present invention is connected to an optical ring network 201. The optical ring transmission apparatus 200 includes: a first ring-side time-division-multiplex (TDM) device 203 having an I/O port (not shown) for connecting to a first ring 202 of the optical ring network 201; a second ring-side TDM device 205 having an I/O port (not shown) for connecting to a second ring 204 of the same optical ring network 201; a switch section 206; and first and second packet ring devices 207 and 208 that can be connected to the first and second ring-side TDM devices 203 and 205, respectively, through the switch section 206. The switch section 206 is configured to incorporate a packet switch 209 and a TDM switch 210 in the same package. The first and second packet ring devices 207 and 208 are directly connected to each other.

The optical ring transmission apparatus 200 further includes first and second client-side TDM devices 212 and 213, each having an I/O port (not shown) for connecting to a client network 211, and first and second packet transceivers 214 and 215, each having an I/O port (not shown) for connecting to the same client network 211. The first and second ring-side TDM devices 203 and 205 and the first and second client-side TDM devices 212 and 213 can be connected to each other through the switch section 206. Thereby, for example, a TDM signal, or virtual container(s), can be forwarded from the first client-side TDM device 212 to a selected one of the first ring-side TDM device 203 and the second ring-side TDM device 205. It is the same with the second ring-side TDM device 213. Although the first and second packet ring devices 207 and 208 are connected to the switch section 206, they do not perform communication with each other through the switch section 206.

Each of the first and second packet ring devices 207 and 208 can convert packet traffic into a TDM signal or virtual container(s), and vice versa. Virtual containers are multiplexed and transmitted to the optical ring network 201 through the switch 206 and a corresponding one of the first ring-side TDM devices 203 and 205. When receiving packet traffic multiplexed in a virtual container from the optical ring network 201 through the switch 206 and a corresponding one of the first ring-side TDM devices 203 and 205, a corresponding one of the first and second packet ring devices 207 and 208 converts packet traffic multiplexed in virtual container into packet ring frames, which will be described later. If a packet ring frame is not destined for its own node, the packet ring frame is directly forwarded to the other packet ring device. If a packet ring frame is destined for its own node, the packet ring frame is demultiplexed into packets, which are then forwarded to the client network 211 through the packet switch 209.

On the other hand, the first and second packet transceivers 214 and 215 and the first and second packet ring devices 207 and 208 can be connected to each other through the packet switch 209. Therefore, for example, a packet can be output from the first packet transceiver 214 to the second packet ring device 208. Each of the first and second packet transceivers 214 and 215 is provided with a routing function that analyzes the destination address of a packet. With this function, the first and second packet transceivers 214 and 215 can forward a packet to any one of the first and second packet ring devices 207 and 208. In addition, the switch section 206 multiplexes TDM traffic and packet traffic and forwards the resultant to a selected one of the first and second ring-side TDM devices 203 and 205, as a result of switching.

Here, each of the first and second packet ring devices 207 and 208 has a function of converting packets into packet ring frames and vice versa and also converting packet ring frames into virtual containers and vice versa, whereby the first and second packet ring devices 207 and 208 are configured to multiplex packets into virtual containers and to demultiplex virtual containers into packets. In addition, the first and second packet ring devices 207 and 208 transmit/receive and relay virtual containers in which packets are multiplexed. When a packet is input from the packet switch 209, a receiving one of the first and second packet ring devices 207 and 208 multiplexes (encapsulates) the packet into a packet ring frame, analyzes the address of the packet ring frame, and determines which one of the first and second rings 202 and 204 is the ring to which this packet ring frame is to be forwarded. The first packet ring device 207 or second packet ring device 208 then multiplexes the packet ring frame on a virtual container suited to be output to the ring network 201 and inputs virtual containers from the optical ring network 201 through the first ring-side TDM device 203 or second ring-side TDM device 205. When no packet traffic destined for the client network 211 is contained in the received virtual container, each of the first and second packet ring devices 207 and 208 is configured to forward packet ring frames to the other one of the packet ring device 207 and 208, without performing the processing for multiplexing the packet ring frame into a virtual container.

Moreover, when each of the first and second packet ring devices 207 and 208 has received virtual containers from the optical ring network 201 through a corresponding ring-side TDM device and the switch section 206, the packet ring device demultiplexes a virtual container to obtain packet ring frames. The packet ring device 207 or 208 then analyzes the destination address of the packet ring frame and, if the packet ring frame is directed to its own node, then performs the processing for extracting packets out of the packet ring frame. On the other hand, if the destination of the packet ring frame is not its own node, the first packet ring device 207 or second packet ring device 208 outputs the packet ring frame to the other packet ring device 207 or 208 in order to relay the packet ring frame.

In the case where the first packet ring device 207 has received a packet ring frame from the second packet ring device 208, the first packet ring device 207 multiplexes the received packet ring frame into a virtual container and forwards it to the switch section 206. The virtual container is forwarded by the switch section 206 to the first ring-side TDM device 203, from which a TDM frame including the virtual container is transmitted to the optical ring network 201. In the case of the second packet ring device 208 having received a packet ring frame from the first packet ring device 207, the second packet ring device 208 multiplexes the received packet ring frame into a virtual container and forwards it to the switch section 206. The virtual container is forwarded by the switch section 206 to the second ring-side TDM device 205, from which a TDM frame including the virtual container is transmitted to the optical ring network 201.

The first and second packet transceivers 214 and 215 are interfaces between the optical ring transmission apparatus 200 and the client network 211, which transmits/receives packets to/from the client network 211. Each of the first and second packet transceivers 214 and 215 is configured to analyze the destination address of a packet input from the client network 211 or from the packet switch 209 and to forward the packet, according to the result of this analysis, to the packet switch 209 or to its own output port.

The packet switch 209 is configured to switch a packet input from any one of the first and second packet transceivers 214 and 215 and the first and second packet ring devices 207 and 208 and output it to an appropriate port depending on its destination address.

The first and second ring-side TDM devices 203 and 205 are interfaces between the optical ring transmission apparatus 200 and the optical ring network 201, which transmits/receives TDM frames to/from the optical ring network 201. Specifically, when a TDM frame is input to any one of the first and second ring-side TDM devices 203 and 205 from the optical ring network 201, the first ring-side TDM device 203 or second ring-side TDM device 205 demultiplexes the TDM frame into virtual containers of a fixed length and outputs them to the switch section 206. The first ring-side TDM device 203 or second ring-side TDM device 205 also multiplexes virtual containers received from the switch section 206 into a frame which is a transmission unit corresponding to the capacity of the optical ring network 201, and outputs the frame to the optical ring network 201. That is, in a TDM network, traffic is multiplexed into units of a fixed length (such a unit is called a virtual container), and a plurality of virtual containers are multiplexed, or grouped together, into a TDM frame, which is then transmitted/received. The number of virtual containers that can be multiplexed varies depending on the transport band of the ring network. Accordingly, the virtual containers to be transmitted are multiplexed into a frame which is a unit corresponding to the capacity of the optical ring network 201 and the frame is transmitted to the ring network.

The first and second client-side TDM devices 212 and 213 are interfaces between the optical ring transmission apparatus 200 and the client network 211, which transmits/receives TDM frames to/from the client network 211. Specifically, when any one of the first and second client-side TDM devices 212 and 213 has received a TDM frame from the client network 211, the client-side TDM device demultiplexes it into virtual containers of a fixed length and outputs them to the switch section 206. The switch section 206 performs switching of the virtual containers in accordance with the path set in each virtual container.

In the case where any one of the first and second client-side TDM devices 212 and 213 has received virtual containers from the switch section 206, the virtual containers are grouped together into a frame which is a unit corresponding to the capacity of the client network 211 and then sent out to the client network 211 via an appropriate port of the first client-side TDM device 212 or second client-side TDM device 213.

The switch section 206 is configured to switch a TDM frame input from any one of the first and second ring-side TDM devices 203 and 205, the first and second client-side TDM devices 212 and 213, and the first and second packet ring devices 207 and 208, to an appropriate output port according to set path information.

2. Functional Configuration

Figure 3:
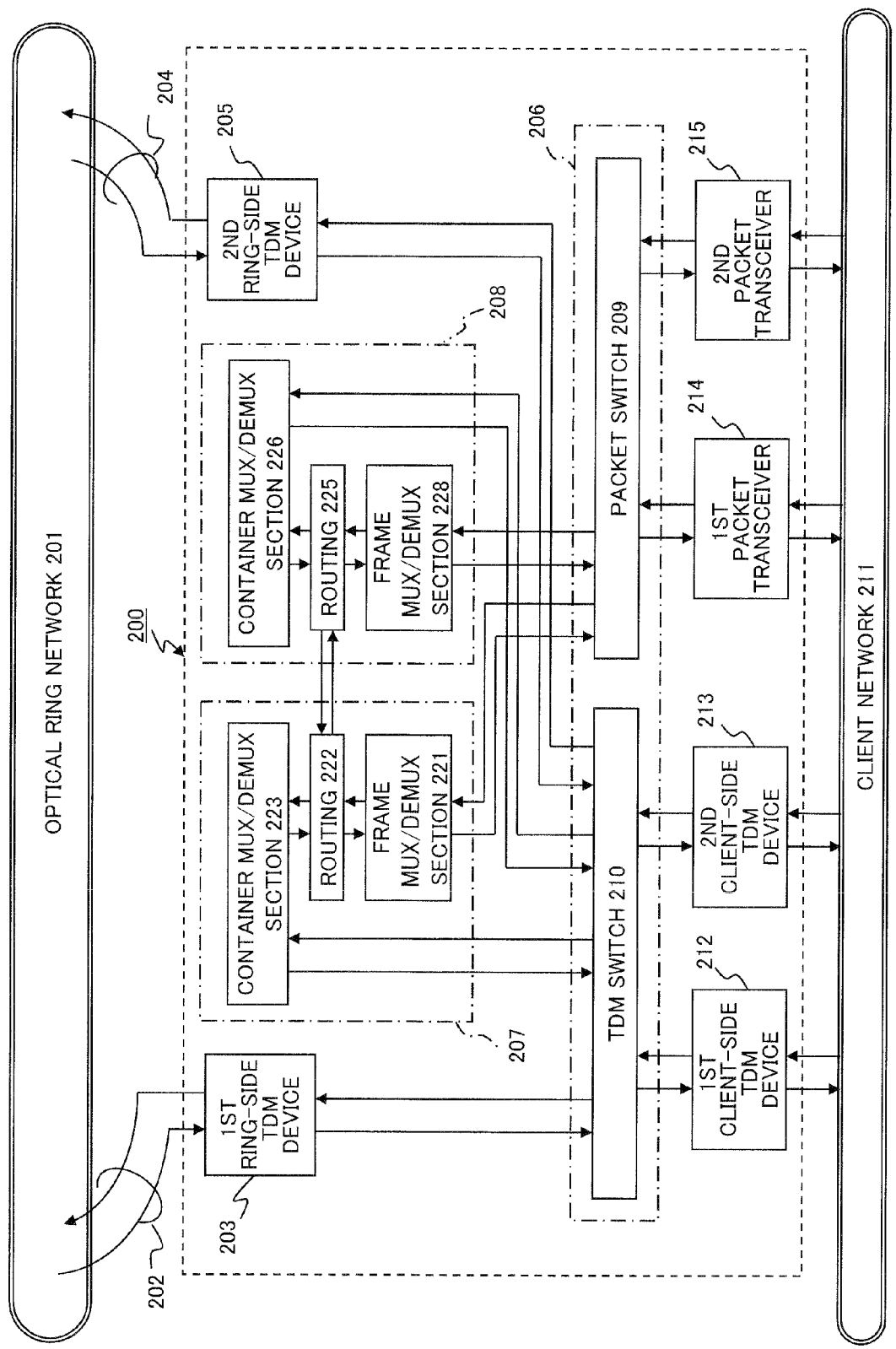
FIG. 3 is a block diagram more specifically showing the optical ring transmission apparatus according to the present exemplary embodiment

FIG. 3 is more specifically shows the optical ring transmission apparatus 200 according to the present exemplary embodiment. The same parts in FIG. 2 are given the same reference numerals, and a description thereof will be omitted in FIG. 3 where appropriate.

The switch section 206 includes the packet switch 209 and the TDM switch 210. The TDM switch 210 switches TDM signals, that is, virtual containers received from the first and second ring-side TDM devices 203 and 205 and the first and second client-side TDM devices 212 and 213.

Moreover, the first packet ring device 207 includes: a frame multiplexing/demultiplexing section 221 that multiplexes packets into a packet ring frame and also demultiplexes a packet ring frame; a routing section 222 that deals with routing of packet ring frames; and a container multiplexing/demultiplexing section 223 that performs processing for multiplexing packet traffic into virtual containers in TDM format and also performs demultiplexing processing, which is the reverse processing to the multiplexing processing. Similarly, the second packet ring device 208 includes a frame multiplexing/demultiplexing section 228, a routing section 225, and a container multiplexing/demultiplexing section 226.

As described above, the packet ring device (207 or 208) multiplexes (encapsulates) a packet received from the packet switch 209 into a packet ring frame. For example, the packet ring device encapsulates the MAC address of an Ethernet™ packet into a packet ring frame with mapping the MAC address to one of closed addresses within the ring network 201, resulting in simplified and efficient packet transfer processing.

It is assumed as an example, that a ring network includes three packet ring device A, B and C, each of which is assigned a unique MAC address of the ring network. When the packet ring device A has received from its client network a packet destined for the packet ring device C via the packet ring device B, the packet ring device A encapsulates the received packet into a packet ring frame, provides the packet ring frame with the MAC address of the packet ring device C as its destination address, and transmits it to the ring network. When having received the packet ring frame, the packet ring device B looks at the MAC address of the received packet ring frame to determine whether it is destined for its own device. Since this packet ring frame is destined for the packet ring device C, the packet ring device B transfers it to the packet ring device C.

In this manner, by encapsulating a packet into a packet ring frame, an address assigned to the packet ring frame is limited to the address system closed within the ring network. Such encapsulation causes the size of an address resolution table to be small, allowing easy comparison between its own MAC address and the MAC address of a received packet ring frame, resulting in efficient packet transfer processing.

3. Packet/TDM Traffic Processing

An example of the transmission of packet traffic performed by the optical ring transmission apparatus 200 will be described specifically based on FIG. 4. Here, it is assumed that a packet received from the client network 211 is forwarded from the first packet transceiver 214 to the first ring 202 by the optical ring transmission apparatus 200.

Figure 4:
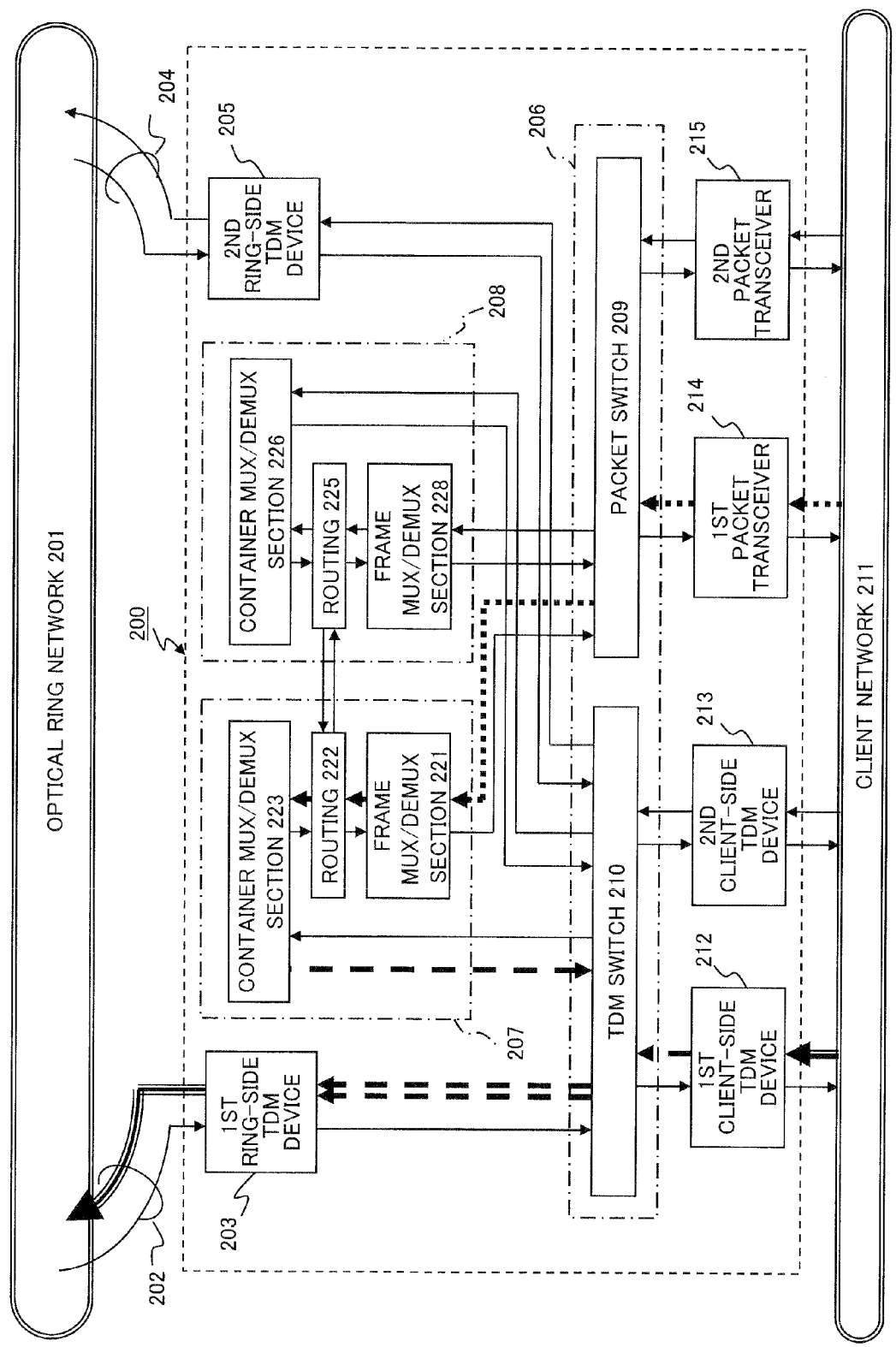
FIG. 4 is a block diagram showing exemplary routes of packet traffic and TDM traffic from a client network to the optical ring network in the optical ring transmission apparatus according to the present exemplary embodiment.

As shown by dotted bold arrows in FIG. 4, the first packet transceiver 214 of the optical ring transmission apparatus 200 has received a packet, which is going to be output to the first ring 202, from the client network 211. The packet is forwarded to the first packet ring device 207 by the packet switch 209 looking at the destination address of the packet.

When the first packet ring device 207 has received the packet from the packet switch 206, the frame multiplexing/demultiplexing section 221 multiplexes the packet on a packet ring frame and then outputs it to the routing section 222. Then, when it is confirmed by the routing section 222 that the packet ring frame should be output to the first ring 202, the container multiplexing/demultiplexing section 223 multiplexes the packet ring frame on a virtual container, and the virtual container is output to the TDM switch 210 of the switch section 206, which is shown by broken bold lines. The TDM switch 210 forwards the virtual container to the first ring-side TDM device 203. The first ring-side TDM device 203 multiplexes virtual containers inputted from the TDM switch 210 into a frame that is a unit corresponding to the capacity of the optical ring network 201 and then outputs it to the first ring 202.

An example of the transmission of TDM traffic performed by the optical ring transmission apparatus 200 will be described specifically based on FIG. 4. Here, it is assumed that a TDM frame received from the client network 211 is forwarded from the first client-side TDM device 212 to the first ring 202 by the optical ring transmission apparatus 200.

As shown by broken bold arrows in FIG. 4, the first client-side TDM device 212 has received a TDM frame, which is going to be output to the first ring 202, from the client network 211. The first client-side TDM device 212 demultiplexes the TDM frame into virtual containers, which is outputted to the TDM switch 210, which is shown by broken bold arrows. The virtual containers are forwarded to the first ring-side TDM device 203 by the TDM switch 210. The first ring-side TDM device 203 multiplexes virtual containers inputted from the TDM switch 210 into a frame that is a unit corresponding to the capacity of the optical ring network 201 and then outputs it to the first ring 202.

As described above, the TDM switch 210 can multiplex a TDM signal (virtual containers) obtained from packet traffic by the packet ring device and another TDM signal (virtual containers) obtained from a TDM frame by the client-side TDM device, to output the resultant signal to the ring-side TDM device. The ring-side TDM device generates a TDM frame from the TDM signals so as to meet the capacity of the ring network 201 and transmits it to the ring network 201.

4. Through Processing

An example of the through transmission of a TDM frame performed by the optical ring transmission apparatus 200 will be described specifically based on FIG. 5. Here, it is assumed that a TDM frame that the first ring-side TDM device 203 has received from the first ring 202 is passed to the second ring 204 through the optical ring transmission apparatus 200.

Moreover, it is assumed that a TDM frame is received from the client network 211 and is outputted to the second ring 204.

As described above, when receiving a TDM frame from the client network 211, the first client-side TDM device 212 demultiplexes it into virtual containers. Each virtual container is then outputted to the TDM switch 210 and, in accordance with a set path, forwarded to the second ring-side TDM device 205. In the second ring-side TDM device 205, the virtual containers are multiplexed into a frame that is a unit corresponding to the capacity of the optical ring network 201 and then output to the second ring 204.

Figure 5:
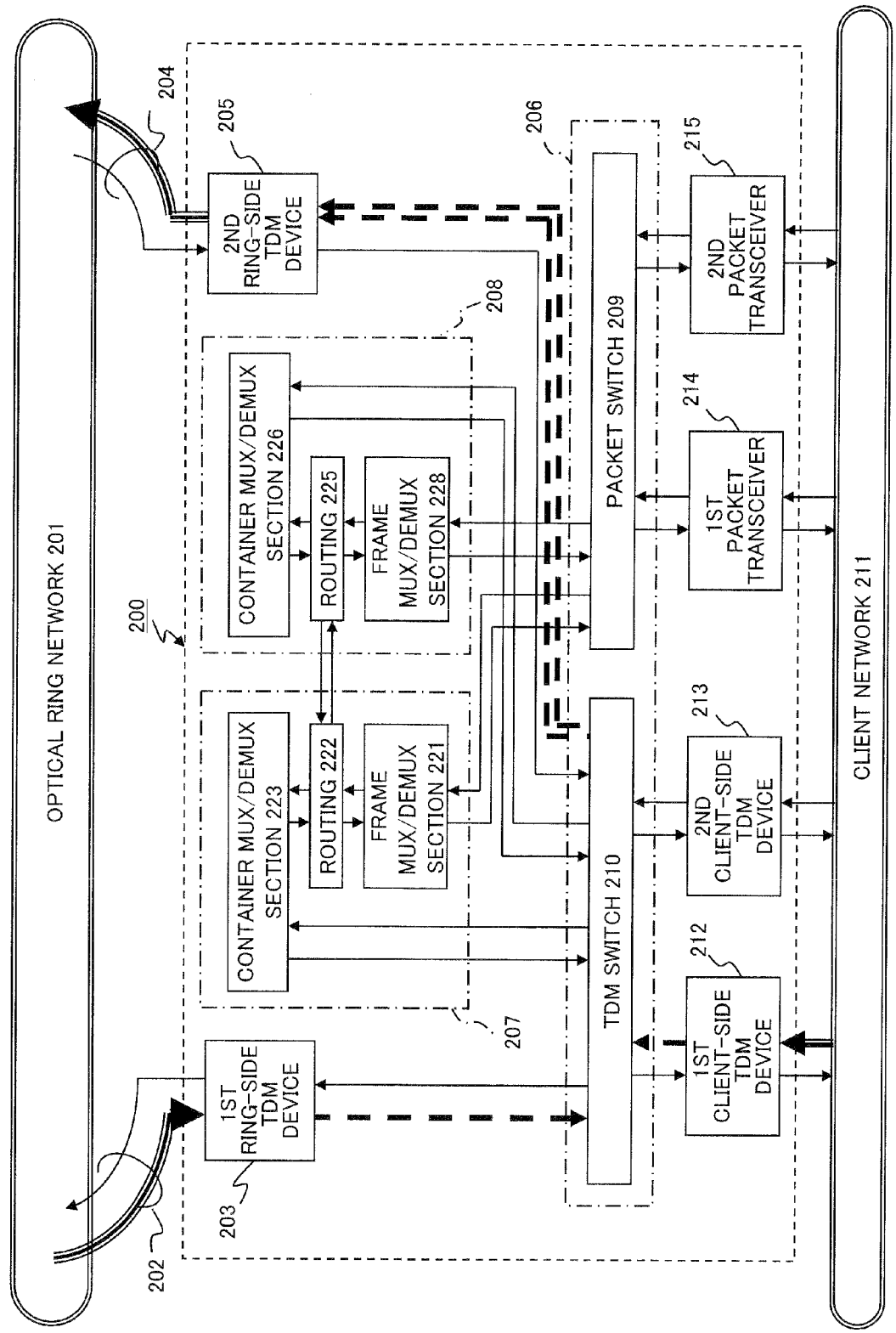
FIG. 5 is a block diagram showing an exemplary route of TDM traffic from a client network to the optical ring network and another exemplary route of TDM traffic passing through the optical ring transmission apparatus according to the present exemplary embodiment.

On the other hand, when the first ring-side TDM device 203 has received a TDM frame from the first ring 202, the first ring-side TDM device 203 demultiplexes it into virtual containers and outputs them to the TDM switch 210, which is shown by broken bold arrow in FIG. 5. In accordance with a set path, the TDM switch 210 forwards them to the second ring-side TDM device 205. In the second ring-side TDM device 205, the virtual containers are multiplexed into a frame that is a unit corresponding to the capacity of the second ring 204 and then output to the second ring 204.

As described above, the TDM switch 210 can multiplex a TDM signal (virtual containers) obtained from a TDM frame by the ring-side TDM device and another TDM signal (virtual containers) obtained from a TDM frame by the client-side TDM device, to output the resultant signal to the ring-side TDM device. The ring-side TDM generates a TDM frame from the TDM signals so as to meet the capacity of the ring network 201 and transmits it to the ring network 201.

5. Example of Circuit

Figure 6:
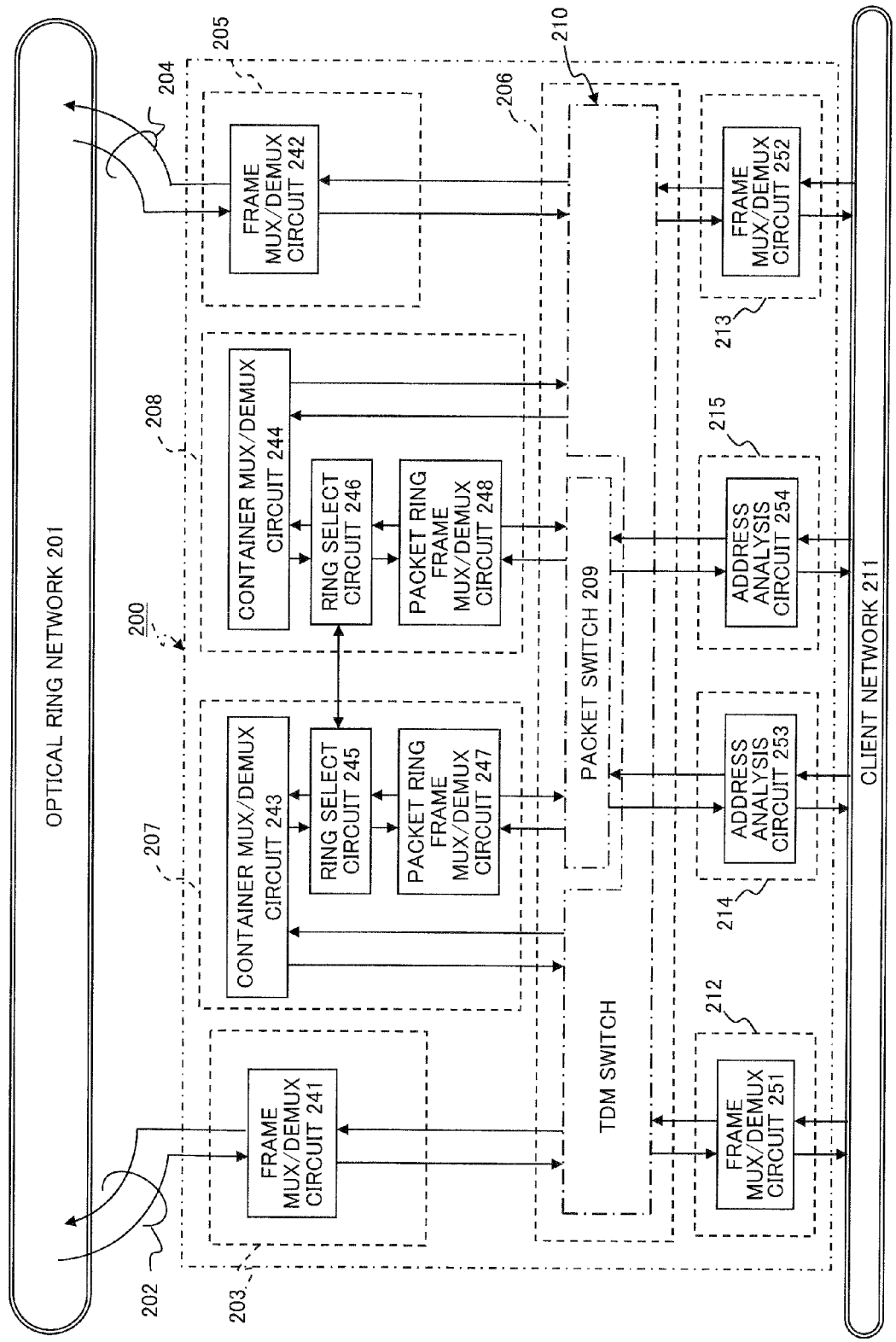
FIG. 6 is a block diagram showing the optical ring transmission apparatus according to the present exemplary embodiment in such a manner that the content of the principal circuitry can be understood.

FIG. 6 shows the optical ring transmission apparatus 200 according to the present exemplary embodiment in such a manner that the content of the principal circuitry can be understood. The same parts as those shown in FIGS. 2 and 3 are given the same reference numerals as in FIGS. 2 and 3, and a description thereof will be omitted where appropriate.

The optical ring transmission apparatus 200 can be configured by hardware circuit. Therefore, the first and second ring-side TDM devices 203 and 205 include corresponding parts of frame multiplexing/demultiplexing circuits 241 and 242, respectively, which perform multiplexing into a frame and also performs demultiplexing, which is the reverse processing to the multiplexing. The first and second packet ring devices 207 and 208 include: corresponding parts of container multiplexing/demultiplexing circuits 243 and 244, respectively, which perform multiplexing into a virtual container of a fixed length and also performs demultiplexing, which is the reverse processing to the multiplexing; corresponding parts of ring selection circuits 245 and 246, respectively, which make a selection between the first and second rings 202 and 204; and corresponding parts of packet ring frame multiplexing/demultiplexing circuits 247 and 248, respectively, which perform multiplexing into a packet ring frame and also perform demultiplexing of a packet ring frame. The first and second client-side TDM devices 212 and 213 include frame multiplexing/demultiplexing circuits 251 and 252, respectively, which perform demultiplexing of a TDM frame and also perform multiplexing, which is the reverse processing to the demultiplexing. The first and second packet transceivers 214 and 215 include corresponding parts of address analysis circuits 253 and 254, respectively, which analyze the destination address of a packet.

Here, the packet switch 209 in the switch section 206 performs switching operation between the packet ring frame multiplexing/demultiplexing circuit 247 or 248 and the address analysis circuit 253 or 254. The TDM switch 210 performs switching control between the frame multiplexing/demultiplexing circuit 251 and the frame multiplexing/demultiplexing circuit 241 or container multiplexing/demultiplexing circuit 243. Similarly, the TDM switch 210 performs switching control between the frame multiplexing/demultiplexing circuit 252 and the frame multiplexing/demultiplexing circuit 242 or container multiplexing/demultiplexing circuit 244.

6. First Example of Transmission Operation

Figure 7:
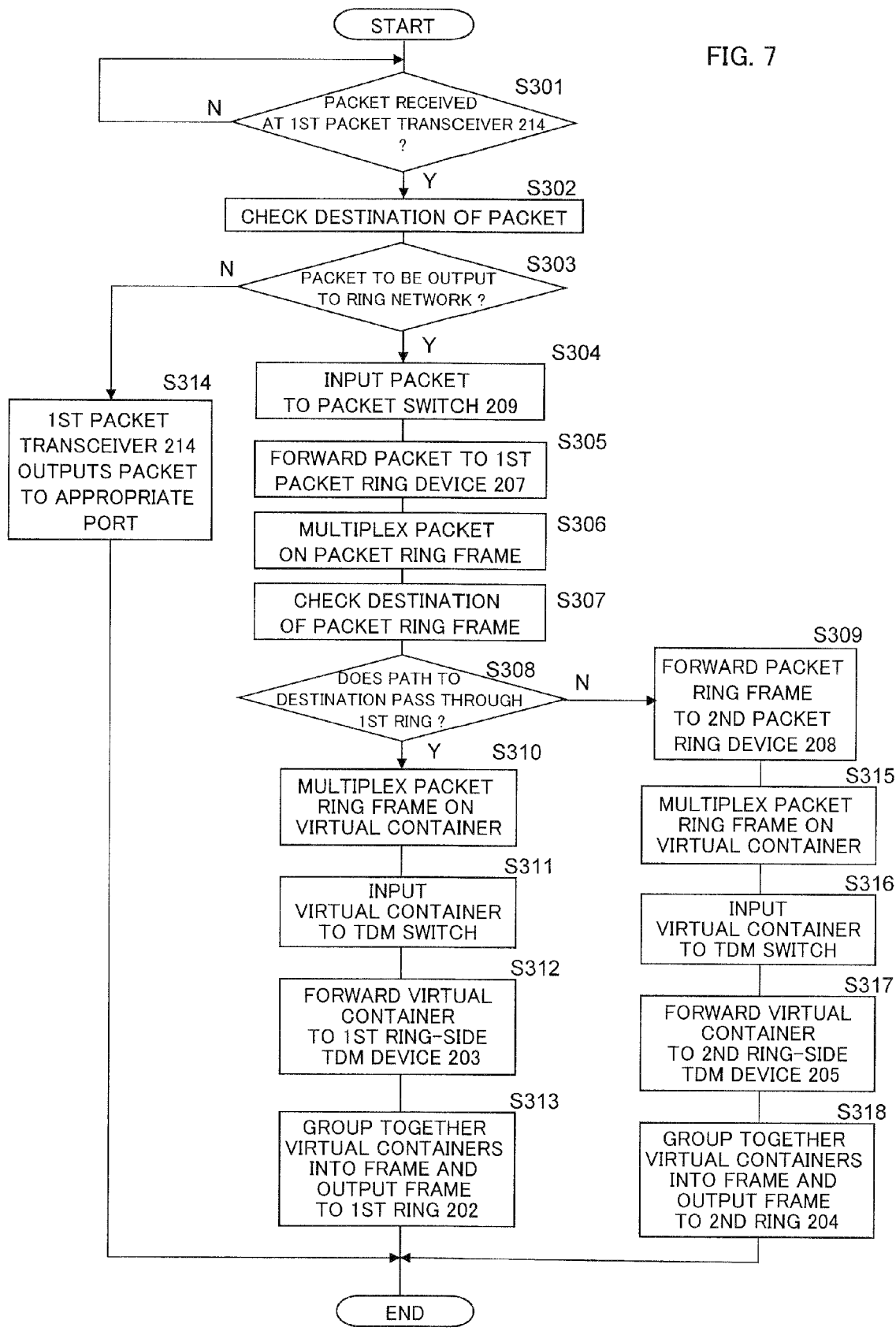
FIG. 7 is a flowchart showing the control performed by the optical ring transmission apparatus when a packet is input to a first packet transceiver, in the present exemplary embodiment.

FIG. 7 shows an example of control performed by the optical ring transmission apparatus 200 when a packet is input to the first packet transceiver 214, as a processing flow between the hardware blocks. The processing flow shown in FIG. 7 will be described in conjunction with FIG. 3 and FIG. 6.

When a packet is received by the first packet transceiver 214 (step S301: Y), the destination of the packet is checked by the address analysis circuit 253 of the first packet transceiver 214 (step S302). As a result of this check, if the packet is to be forwarded to the optical ring network 201 (step S303: Y), the packet is forwarded to the packet switch 209 (step S304), from which the packet is forwarded to the first packet ring device 207 (step S305).

In the first packet ring device 207, the packet ring frame multiplexing/demultiplexing circuit 247 multiplexes the packet on a packet ring frame (step S306), and the ring selection circuit 245 checks the destination of the packet ring frame (step S307). Then, the ring selection circuit 245 determines whether or not a path to this destination is set toward the first ring 202 (step S308). When the path to this destination is set toward the second ring 204 (step S308: N), this packet ring frame is forwarded from the ring selection circuit 245 to the ring selection circuit 246 in the second packet ring device 208 (step S309).

Contrarily, when the path to this destination is set toward the first ring 202 (step S308: Y), the packet ring frame is input to the container multiplexing/demultiplexing circuit 243, where the packet ring frame is multiplexed on a virtual container (step S310), which is then output to the TDM switch 210 of the switch section 206 (step S311). The TDM switch 210 forwards the virtual container with the packet ring frame multiplexed therein, to the frame multiplexing/demultiplexing circuit 241 of the first ring-side TDM device 203 (step S312). The frame multiplexing/demultiplexing circuit 241 multiplexes the thus input virtual containers into a frame that is a unit corresponding to the capacity of the optical ring network 201 and outputs the frame to the first ring 202 (step S313).

In the step S303, when it is determined that the packet is not a packet to be output to the optical ring network 201 (step S303: N), the first packet transceiver 214 sends this packet to an appropriate port according to the address analyzed by the address analysis circuit 253 (step S314).

On the other hand, in the case where the destination of the packet ring frame is the second ring 204 (step S308: N) and where the packet ring frame is forwarded to the ring selection circuit 246 in the second packet ring device 208 (step S309), then the packet ring frame is output to the container multiplexing/demultiplexing circuit 244, where the packet ring frame is multiplexed on a virtual container (step S315), which is then output to the TDM switch 210 of the switch section 206 (step S316). The TDM switch 210 forwards the virtual container with the packet ring frame multiplexed therein to the frame multiplexing/demultiplexing circuit 242 of the second ring-side TDM device 205 (step 317). The frame multiplexing/demultiplexing circuit 242 multiplexes the thus input virtual containers into a frame that is a unit corresponding to the capacity of the optical ring network 201 and outputs the frame to the second ring 204 (step S318).

7. Second Example of Transmission Operation

Figure 8:
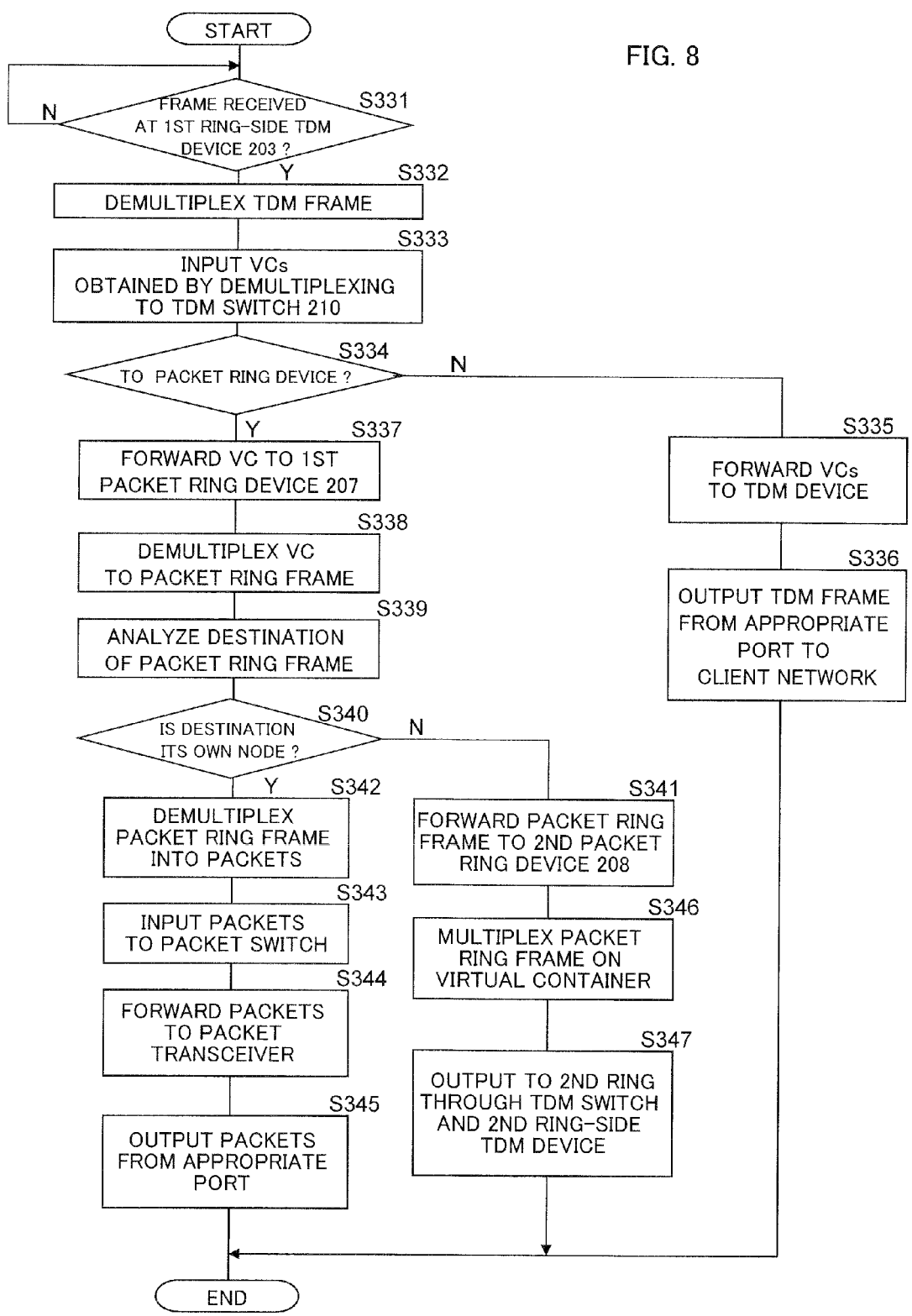
FIG. 8 is a flowchart showing the control performed when a TDM frame is input from the ring network to a first ring-side TDM device, in the present exemplary embodiment.

FIG. 8 shows a processing flow in the case where a TDM frame is input from the ring network to the first ring-side TDM device 203, as a processing flow between the hardware blocks. The processing flow shown in FIG. 8 will be described in conjunction with FIG. 3 and FIG. 6.

When a TDM frame from the first ring 202 is received by the first ring-side TDM device 203 (step S331: Y), the frame multiplexing/demultiplexing circuit 241 of the first ring-side TDM device 203 demultiplexes the TDM frame (step S332). Each virtual container obtained by the demultiplexing is input to the TDM switch 210 of the switch section 206 (step S333).

The TDM switch 210 performs switching for the input virtual container, in accordance with a set path (step S334). Specifically, when the destination of the virtual container is not any of the first and second packet ring devices 207 and 208 (step S334: N), the virtual container is forwarded to the first client-side TDM device 212 or second client-side TDM device 213 (step S335). Then, the frame multiplexing/demultiplexing circuit 251 or 252 multiplexes the thus input virtual containers into a frame that is a unit corresponding to the capacity of the client network 211 and outputs the frame to the client network 211 from an appropriate port (step S336).

On the other hand, when it is determined in the step S334 that the destination of the virtual container is the first packet ring device 207 (step S334: Y), the virtual container is forwarded to the first packet ring device 207 (step S337). The first packet ring device 207 inputs the received virtual container to the container multiplexing/demultiplexing circuit 243, where the virtual container is demultiplexed into a packet ring frame (step S338) and the destination of the packet ring frame is analyzed (step S339). As a result, when the destination of the packet ring frame is not its own node (step S340: N), the packet ring frame is again forwarded to the other second packet ring device 208 (step S341).

Contrarily, when the destination of the packet ring frame is its own node (step S340: Y), the first packet ring device 207 demultiplexes the packet ring frame into packets (step S342) and inputs the packets to the packet switch 209 (step S343). The packet switch 209 forwards the packets to an appropriate one of the first and second packet transceivers 214 and 215 (step S344). The first packet transceiver 214 or second packet transceiver 215 analyzes the destination address of each packet by using the address analysis circuit 253 or 254 and outputs the packet to the client network 211 from an appropriate port (step S345).

On the other hand, in the case where it is determined that the destination of the packet ring frame is not its own node in the step S340 and where the packet ring frame is forwarded to the second packet ring device 208 in the step S341, then the packet ring frame is multiplexed into a virtual container by the container multiplexing/demultiplexing circuit 244 of the second packet ring device 208 (step S346). Then, the virtual container is forwarded to the second ring-side TDM device 205 through the TDM switch 210 of the switch section 206. The second ring-side TDM device 205 multiplexes the thus input virtual containers into a frame that is a unit corresponding to the capacity of the second ring 204 and outputs the frame to the second ring 204 (step S347).

8. Various Aspects

It should be noted that the control flows as shown in FIGS. 7 and 8 are just examples and therefore the present invention is not limited to these examples. For example, in the case where a packet is received at the second packet transceiver 215 or in the case where a TDM frame is received at the second ring-side TDM device 103, transmission operations are similarly performed.

As described above, the optical ring transmission apparatus 200 according to the present exemplary embodiment has a configuration in which dual packet ring devices are provided as the first and second packet ring devices 207 and 208 so that a packet ring frame can be flexibly input to any one of these packet ring devices. Therefore, even if one of the first and second packet ring devices 207 and 208 fails, the other packet ring device can maintain the services, resulting in enhanced reliability.

On the other hand, with consideration given to the increasing rate of data packets in recent years, the optical ring transmission apparatus 200 according to the present exemplary embodiment is configured to be able to change implementation proportions so that the part forming a greater implementation proportion can be changed from a TDM device, which processes voice traffic, to a packet processing device, which processes data packet traffic. That is, according to the present exemplary embodiment, the first and second packet ring devices 207 and 208 and the first and second packet transceivers 214 and 215, which process packets, are implemented separately from a package that performs switching processing. Thereby, it is possible to easily achieve enhancement of the rate of the data packet traffic.

In this manner, the first and second packet ring devices 207 and 208 are implemented independently of the inputs and outputs to/from the optical ring network 201. Accordingly, it is possible to use a general high-speed interface on the I/O side connecting to the optical ring network 201. Therefore, as the implementation proportion of the packet switching function increases, the implementation costs can be reduced in comparison with conventional apparatuses.

Moreover, according to the present exemplary embodiment, the first and second packet ring devices 207 and 208 are implemented independently of the inputs and outputs to/from the optical ring network 201. Accordingly, when a packet function is added to a TDM-based apparatus, it is not necessary to change the setting of the interface portion on the I/O side connecting to the optical ring network 201. That is, it is sufficient only to make a change in the setting of the switch section 206. Accordingly, in operational terms, it is possible to easily upgrade an apparatus from the TDM-based one to the packet-based one.

Furthermore, according to the present exemplary embodiment, since a dual configuration is made by using the first and second packet ring devices 207 and 208, communications can be maintained even if one of the first and second packet ring devices 207 and 208 fails, by using the other packet ring device. Accordingly, it is possible to construct a highly reliable network.

According to the present invention, the packet ring devices are implemented independently of the I/O interfaces with the ring network, whereby a general high-speed interface can be used on the I/O side connecting to the ring network. Accordingly, as the implementation proportion of the packet switch functionality rises, the greater merit in implementation cost can be recognized, in comparison with conventional schemes. Moreover, when a packet function is added to a TDM-based apparatus, since the packet ring devices are implemented independently of the I/O interfaces with the ring network, it is not necessary to change the setting of the interface portion on the I/O side connecting to the ring network, and it is sufficient only to make a change in the setting of the TDM switch. Accordingly, in operational terms, it can be facilitated to upgrade an apparatus from the TDM-based one to the packet-based one.

Needless to say, although the optical ring transmission apparatus connected to the optical ring network is described in the present exemplary embodiment, the present invention can be similarly applied to ring transmission apparatuses that deal with signals of other types than optical signals.

The present invention may be embodied in other specific forms without departing from the spirit or essential characteristics thereof. The above-described exemplary embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A ring transmission apparatus which connects a ring network and a client network, comprising:
a switch;
first and second ring-side interface devices which are connected to respective ones of first and second rings of the ring network and to the switch, wherein each of the first and second ring-side interface devices transmits and receives time-division multiplexing (TDM) frames to and from the ring network and transmits and receives TDM signals corresponding to the TDM frames to and from the switch;
a client-side TDM interface section which is connected to the client network, wherein the client-side TDM interface section processes TDM traffic transmitted and received to and from the client network and transmits and receives TDM signals corresponding to the TDM traffic to and from the switch;
a client-side packet interface section which is connected to the client network, wherein the client-side packet interface section processes packet traffic transmitted and received to and from the client network and transmits and receives packets corresponding to the packet traffic to and from the switch; and
a packet converting section connected to the switch, for converting packets received from the client-side packet interface section to TDM signals and converting TDM signals received from one of the first and second ring-side interface devices to packets,
wherein the packet converting section is separated from the first and second ring-side interface devices and the switch,
wherein the switch multiplexes a TDM signal generated from TDM traffic and another TDM signal generated from packet traffic and demultiplexing a TDM signal into TDM traffic and packet traffic,
wherein each of the first and second ring-side interface devices has a function of multiplexing TDM signals into a TDM frame which is a unit corresponding to a capacity of the ring network and demultiplexing a TDM frame received from the ring network into TDM signals,
wherein a TDM signal includes a virtual container of a fixed length,
wherein the packet converting section comprises first and second packet ring devices each corresponding to the first and second ring-side interface devices, wherein each of the first and second packet ring devices comprises:
a first converter for converting packets to packet ring frames and vice versa;
a routing section for routing packet ring frames to the other packet ring device when a packet ring frame is destined for the other ring-side interface device; and
a second converter for converting packet ring frames to virtual containers and vice versa.

2. The ring transmission apparatus according to claim 1, wherein the switch comprises a TDM switch and a packet switch, wherein the packet switch is connected to the first converter.

3. The ring transmission apparatus according to claim 2, wherein the ring network is an optical ring network.

4. The ring transmission apparatus according to claim 3, wherein the first and second ring-side interface devices are a high-speed interface.

5. A signal processing method in a ring transmission apparatus which connects a ring network and a client network, wherein the ring transmission apparatus includes:
a switch;
first and second ring-side interface devices which are connected to respective ones of first and second rings of the ring network and to the switch, wherein each of the first and second ring-side interface devices transmits and receives time-division multiplexing (TDM) frames to and from the ring network and transmits and receives TDM signals corresponding to the TDM frames to and from the switch;
a client-side TDM interface section which is connected to the client network;
a client-side packet interface section which is connected to the client network; and
a packet converting section connected to the switch, wherein the packet converting section is separated from the first and second ring-side interface devices and the switch,
the method comprising:
at the client-side TDM interface section,
processing TDM traffic transmitted and received to and from the client network;
transmitting and receiving TDM signals corresponding to the TDM traffic to and from the switch;
at the client-side packet interface section,
processing packet traffic transmitted and received to and from the client network;
transmitting and receiving packets corresponding to the packet traffic to and from the switch;
at the packet converting section,
converting packets received from the client-side packet interface section to TDM signals; and
converting TDM signals received from one of the first and second ring-side interface devices to packets,
wherein the switch multiplexes a TDM signal generated from TDM traffic and another TDM signal generated from packet traffic and demultiplexing a TDM signal into TDM traffic and packet traffic,
wherein each of the first and second ring-side interface devices multiplexes TDM signals into a TDM frame which is a unit corresponding to a capacity of the ring network and demultiplexes a TDM frame received from the ring network into TDM signals,
wherein a TDM signal includes a virtual container of a fixed length,
wherein the packet converting section comprises first and second packet ring devices each corresponding to the first and second ring-side interface devices, wherein the method comprises:
at each of the first and second packet ring devices,
converting packets to packet ring frames and vice versa;
routing packet ring frames to the other packet ring device when a packet ring frame is destined for the other ring-side interface device; and
converting packet ring frames to virtual containers and vice versa.

* * * * *